United States Patent
Litzenberger (10) Patent No.: US 10,198,449 B2
(45) Date of Patent: Feb. 5, 2019

(54) CREATING UNIQUE CONTENT ITEM IDENTIFIERS

(71) Applicant: Dropbox, Inc., San Francisco, CA (US)

(72) Inventor: Dwayne Litzenberger, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 224 days.

(21) Appl. No.: 14/316,512

(22) Filed: Jun. 26, 2014

(65) Prior Publication Data

US 2015/0026222 A1  Jan. 22, 2015

Related U.S. Application Data

(60) Provisional application No. 61/846,966, filed on Jul. 16, 2013.

(51) Int. Cl.
*G06F 17/30* (2006.01)

(52) U.S. Cl.
CPC ............... *G06F 17/30109* (2013.01)

(58) Field of Classification Search
CPC ......... G06F 17/30109; G06F 17/30106; G06F 17/301
See application file for complete search history.

(56) References Cited

U.S. PATENT DOCUMENTS

| | | | | |
|---|---|---|---|---|
| 5,956,479 A * | 9/1999 | McInerney | ......... | G06F 11/3664 714/38.13 |
| 6,249,782 B1 * | 6/2001 | Day | ................. | G06F 17/30067 |
| 8,447,801 B1 * | 5/2013 | Roche | ................... | H04L 67/306 707/736 |
| 2006/0178954 A1 * | 8/2006 | Thukral | .............. | G06Q 10/087 705/28 |
| 2006/0277059 A1 * | 12/2006 | J'maev et al. | ......... | G06Q 10/06 705/29 |
| 2007/0266441 A1 * | 11/2007 | Kim | ........................ | G06F 21/10 726/26 |
| 2008/0208996 A1 * | 8/2008 | Thompson | ............ | H04L 67/104 709/206 |
| 2012/0102079 A1 * | 4/2012 | French | ............. | G06F 17/30165 707/827 |
| 2012/0254140 A1 * | 10/2012 | Srinivasaraghavan | ...................... | G06F 17/30215 707/705 |
| 2013/0212321 A1 * | 8/2013 | Talagala | .............. | G06F 12/0246 711/103 |

OTHER PUBLICATIONS

Nick Parlante, Pointer Basics, 1999, Stanford CS Education Library.*

* cited by examiner

*Primary Examiner* — Ashish Thomas
*Assistant Examiner* — Dustin D Eyers
(74) *Attorney, Agent, or Firm* — Polsinelli PC (57) ABSTRACT

The disclosed technology generates unique identifiers for content items in a multi-user network-based content management system. The generated identifiers satisfy at least the properties of, (1) the GUID is unique on the local client device; (2) the GUID is preserved across reboots, moves, renames, and content item modifications; (3) the GUID is not preserved when the content item is copied; and (4) the GUID is not reused after a content item is deleted. The unique identifiers allow the content management system to model each user account as a collection of content item objects and globally unique identifiers instead of as a directory-based hierarchy of content items.

14 Claims, 4 Drawing Sheets

CREATING UNIQUE CONTENT ITEM IDENTIFIERS

CROSS REFERENCE TO RELATED APPLICATIONS

This application claims priority to U.S. provisional application No. 61/846,966, filed on Jul. 16, 2013, which is expressly incorporated by reference herein in its entirety.

TECHNICAL FIELD

The present technology pertains to creating a unique identifier for a content item, and more specifically pertains to creating a unique identifier that can be used to maintain a relationship between an original content item and a copied, moved, or renamed version of the content item.

BACKGROUND

Network-based synchronized content management systems allow users to upload and store content items in a cloud-based storage associated with an account, which the users can then access from virtually any network-enabled computing device. One popular feature provided by content management systems is the ability for one user to share content stored in their account with someone else, who may or may not be a user of the content management system. In some cases, the sharing can occur by the user sharing a link, or other pointer, to the content item within the content management system. When the share links or pointers are tied to a directory structure that reflects content item relationships changes to a content item that alter the relationships can break the share links. For example, when the user moves or renames a content item the user's action alters the directory structure, thereby breaking the link. When the link is broken the link recipient is no longer able to access the content item, which decreases the user experience.

Using content item paths and/or content item names in a hierarchical directory structure has other drawbacks as well. For example, it is a suboptimal solution for third party developers attempting to refer to a specific content item and all of its revisions because it requires the developer to have knowledge of the location of the content item in the content management system.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for generating a proposed globally unique identifier (GUID) for a content item. Typically a content item is assigned a globally unique identifier (GUID) at a content item creation event, and the content management system maintains an association between the GUID the content item across user-level edit operations and user-level move operations. The content management system can be configured to assign a new GUID for a user-level content item copy operation or for other operations that result in a new content item. When each content item in the space is assigned a GUID, the content management system, client devices, as well as third-party developers can easily refer to a specific content item and all of its revisions without requiring knowledge of or dependency on the location of the content item in the content item system. With GUIDs, a collection of content items in a user account at the content management system can be represented as a plain set of content item objects, regardless of their actual location. This makes it possible for the content management system to model a user account as a collection of content items that are independent of a directory-based hierarchy of content items.

A GUID generator can be configured to generate a proposed GUID for a content item that satisfies at least the properties of, (1) the GUID is unique on the local client device; (2) the GUID is preserved across reboots, moves, renames, and content item modifications; (3) the GUID is not preserved when the content item is copied; and (4) the GUID is not reused after a content item is deleted. To satisfy these four properties, the GUID generator can construct a proposed GUID by combining a randomly generated GUID extended file attribute (xattr), a volume identifier, and an index node (inode) number for the content item. In the case where the content item is a symbolic to a target content item, the GUID generator can construct a proposed GUID by combining a randomly generated GUID xattr for the target content item with a volume identifier and an index node (inode) number for the symbolic link content item.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

One popular feature provided by online synchronized content management systems is the ability for a user to share content stored in their account with someone else, who may or may not be a user of the content management system. The sharing can occur through a variety of methods, but one convenient technique is through share links. In this model, a user requests a link to a content item, which can be a collection of items, stored in the content management system, and distributes the link to one or more recipients. When a recipient activates the link the recipient is granted access to the content item. For example, the link can be a specially crafted URL that the link sharer can distribute. Then the link recipient can use the URL within a web browser to view the content item.

A common manner of referencing content items relies on content item paths and/or content item names in a hierarchical directory structure. This technique is beneficial because it reflects content item relationships without additional record keeping. However, the technique has a side effect of fragile links. That is, any changes to a content item that alter the relationships between the content items can break a share link. For example, when the user moves or renames a content item the change alters the directory structure, thereby breaking the link. Once the link is broken, the link recipient is no longer able to access the content item.

Using content item paths and/or content item names in a hierarchical directory structure has other drawbacks as well. For example, it is a suboptimal solution for third party developers attempting to refer to a specific content item and all of its revisions because it requires the developer to have knowledge of the location of the content item in the content management system.

The disclosed technology addresses these limitations by assigning each content item a unique identifier that can be used to maintain a relationship between the original content item and a copied, moved, or renamed version of the content item. Typically a content item is assigned a globally unique identifier (GUID) at a content item creation event, and the content management system maintains an association between the GUID the content item across user-level edit operations and user-level move operations. The content management system can be configured to assign a new GUID for a user-level content item copy operation or for other operations that result in a new content item. When each content item in the space is assigned a GUID, the content management system, client devices, as well as third-party developers can easily refer to a specific content item and all of its revisions without requiring knowledge of or dependency on the location of the content item in the content item system. With GUIDs, a collection of content items in a user account at the content management system can be represented as a plain set of content item objects, regardless of their actual location. Content item paths, as represented within the user account, can be represented or stored as just another attribute of a content item object, along with other attributes such as time of creation, time of last modification, author or owner, or content item size. Thus, GUIDs allow for building new organizational structures outside of the content item system. For example, GUIDs can be used to provide a way for users to participate in comment streams for a content item, photo albums, playlists, and content items or folders that are shared, such as via a public or private URL, that aren't sensitive to or dependent on a particular content item system location. Further, GUIDs allow for a richer set of functionality for document editing and sharing. With GUIDs, the content manage system can also implement aliases, symbolic links, or shortcuts.

Systems, methods, and computer-readable storage media for creating a unique identifier (UID) in a network-based content management system are further disclosed herein, from the perspective of a computing device creating a UID for a content item. The content management system can be a multi-user network-based content management environment. Each user of the content management system can be associated with a respective user account having an amount of storage space within the content management system. The content management system can model a user account as a collection of content item objects and globally unique identifiers that are independent of a directory-based hierarchy of content items.

The disclosed technology provides a platform independent technique for generating UIDs for content items in a multi-user network-based content management system. A GUID is a globally unique identifier for a content item within a particular storage space, storage domain, content item object space, or other space for storing content items. The storage space can include the entire available storage in a storage environment or a portion thereof. The storage environment can provide accounts for users that can store and access their own content items in the storage environment. For example, a user can upload content items to the storage environment via a web interface or a native client application on a client device. After the content items are uploaded to the account, the user can access those content items via their account from virtually any other network-enabled computing device. The user can also share content items or folders in their account with other users. Thus, the storage environment can maintain different user accounts for different users, each of which can contain numerous content items, folders, and metadata. Each item in the storage environment can be associated with a GUID.

Figure 1:
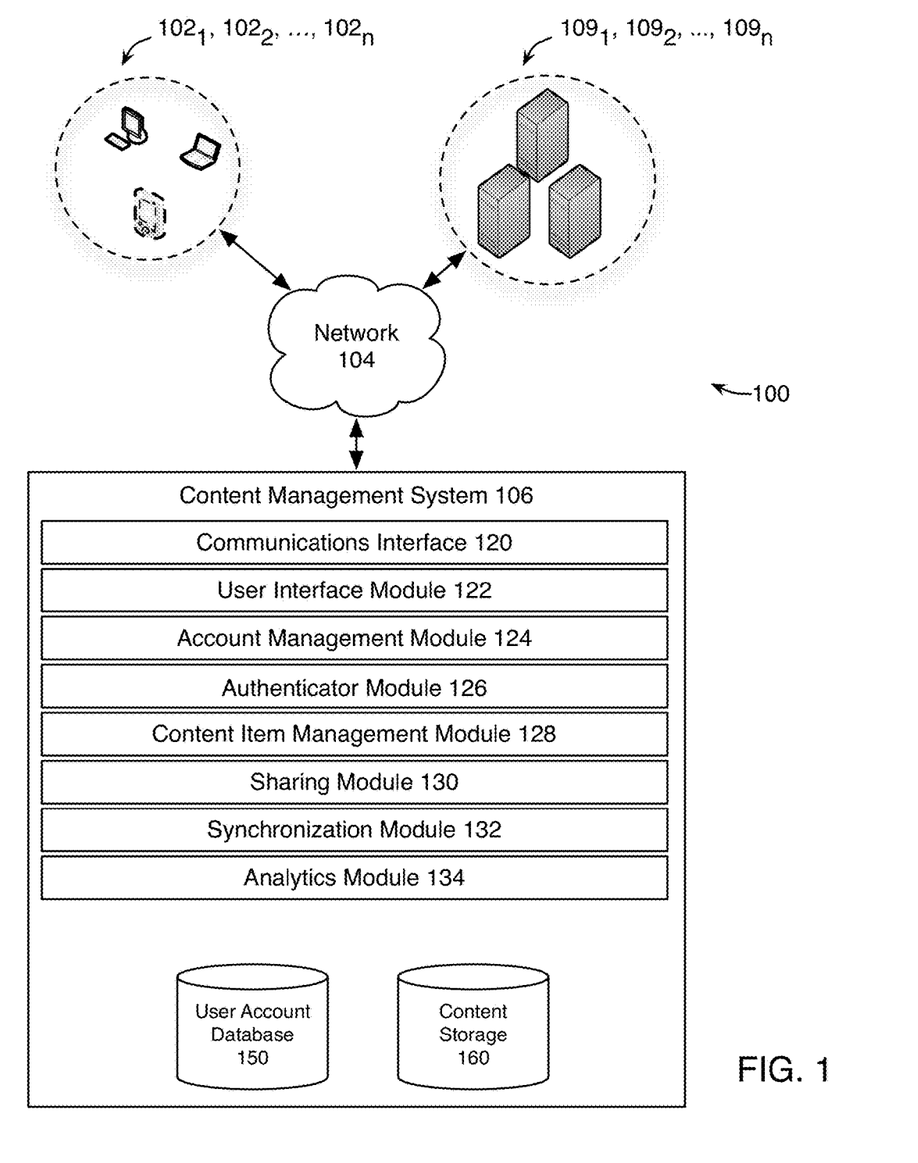
FIG. 1 shows an exemplary configuration of devices and a network in accordance with the invention.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, . . . , $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include folders of various types with different behaviors, or other mechanisms of grouping content items together, such as collections, playlists, albums, etc. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers 109₁, 109₂, . . . , 109ₙ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible.

Figure 2:
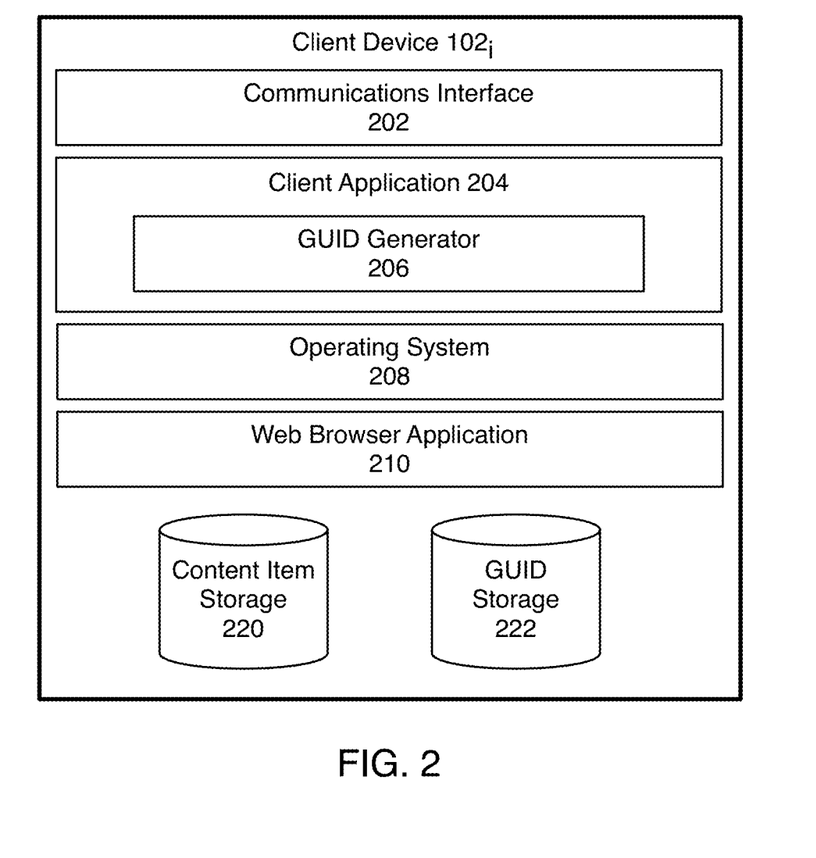
FIG. 2 shows an exemplary client device configuration in accordance with the invention.

FIG. 2 shows an exemplary configuration of a client device 102ᵢ. As disclosed above, client device 102ᵢ can include a number of components and/or client side applications for accessing functionality provided by content management system 106. The components and/or applications can include one or more databases or storage structures for storing data relevant to the operation of the system, e.g. content item storage 220 and GUID storage 222, and one or more modules and/or client applications for interacting with the storage structures and/or controlling the features provided by content management system 106, e.g. communications interface 202, content management client application 204, operating system 208, and web browser application 210. Each of the components in FIG. 2 is discussed in more detail below; however, it should be understood by one skilled in art, that the architectural configuration illustrated in FIG. 2 is simply one possible configuration and that other configurations with more or less components are also possible.

Client device $102_i$ can include content management client application 204, which can communicate, via communications interface 202 and network 104, with content management system 106 to synchronize content items stored in content storage 160 and GUIDs associated with the content items. Client application 204 can also include functionality for generating a proposed GUID for a content item through GUID generator module 206. GUID generator 206 can generate proposed GUIDs for local content item operations that require a new GUID. However, content management system 106 can maintain the canonical GUID records. Therefore, any GUIDs proposed by GUID generator 206 may be accepted or replaced by content management system 106. Client device $102_i$ can include operating system 208 that maintains unique identifiers for the content items according to an operating system schema that may be different from the GUIDs maintained for use with content management system 106.

Client device $102_i$ can also include web browser application 210 that can be used to communicate with content management system 106, such as through communications interface 202. In some cases, web browser application 210 can communicate with content management system 106 using HTTP. Web browser 210 can be configured to execute client-side scripting languages, such as JavaScript, or other web browser executable languages, and then transmit the results to content management system 106. Furthermore, web browser application 210 can receive authentication responses from content management system 106, such as responses specific to a successful or failed authentication.

GUID generator 206 can be configured to generate a proposed GUID for a content item that satisfies a set of properties. The properties include: (1) the GUID is unique on the local client device; (2) the GUID is preserved across reboots, moves, renames, and content item modifications; (3) the GUID is not preserved when the content item is copied; and (4) the GUID is not reused after a content item is deleted. Microsoft® Windows® provides an Object ID that satisfies these four properties. Object IDs are preserved across edits as long as applications implement their edit behavior using ReplaceFile( ). However, other operating systems, such as Mac® OS X® and Linux™, based operating systems do not provide similar functionality.

To address this limitation and provide a platform independent technique for GUID generation that satisfies the four properties, GUID generator 206 can use a combination of content item information or attributes provided by a client device's operating system. A first piece of content item information is a volume identifier, index node (inode) number pair. A (volume_id, inode_number)-pair satisfies properties 1-3 above, but may be reused after a content item is deleted. A second piece of content item information is extended file attributes (xattrs). A randomly generated GUID xattr satisfies properties 1, 2, and 4 above, but may be preserved when a content item is copied. To prevent GUID xattrs from being reused for a copied version of a content item, GUID generator 206 can construct the GUID xattr in such a way that it is bound to the volume_id and inode_number of the content item. For example, a GUID xattr for a proposed GUID can be constructed by concatenating n bytes of random data with the volume_id and the inode_number, i.e. n_bytes_random_data+volume_id+inode_number. By combining a (volume_id, inode_number) pair with a randomly generated GUID xattr, GUID generator 206 can construct a proposed GUID that satisfies all four properties.

In some cases, a content item can be a symbolic link (symlink), which is a reference to another content item—the target content item. A symlink is a content item itself that exists independently of its target content item. In most cases, a symlink operates transparently and is automatically interpreted and followed by the operating system as a path to the target content item. If a symlink is deleted, the target content item remains. However, if the target content item is moved, renamed or deleted, the symlink is not automatically updated or deleted, and instead remains but points to a non-existing content item. Because xattrs cannot be set on symlinks, GUID generator 206 can construct a proposed GUID for a symlink content item using the (volume_id, inode_number) pair for the symlink and the GUID xattr of the target content item. In this case, it is possible that a proposed GUID for a symlink content item may not satisfy property four in the follow scenario: a symlink is deleted, a new symlink is created for the same target content item, and the client device's operating system reuses the inode number. However, such a scenario is equivalent to a rename operation, and thus when examined as a rename operation the four properties are satisfied.

A GUID can be a variable length identifier, such as a printable string of characters. Example printable string formats for proposed GUIDs are provided below:

guid_xattr format (binary):
    "\x00" + 7_bytes_random_data + volume_id + inode_number
proposed_guid format for non-symlinks:
    urlsafe_base64("\x01" + 7_bytes_random_data + volume_id + inode_number)
proposed_guid format for symlinks:
    urlsafe_base64("\x02" + 7_bytes_random_data + symlink_volume_id + symlink_inode_number)
proposed_guid format on Windows:
    urlsafe_base64("\x03\x00\x00\x00" + volume_serial_number + object_id)

GUIDs allow content management system 106 to model each namespace, e.g., user account, as a set of content item objects with unique identifiers instead of as a directory-based hierarchy of content items. GUIDs can include one of three potential relationships. The first relationship is one GUID to many content item revisions, modeled as (rev_id, ns_id, sj_id). Content management system 106 can track mappings of a GUID to a current path of the content item in content management system 106, modeled as (ns_id, path). This mapping may not exist or may be null if the content item object is not currently located anywhere in content management system 106, such as a GUID for a content item that previously existed but has since been deleted. The first relationship maps a GUID to a sequence of content item revisions for a content item object designated by that GUID. Revisions and content item objects can span multiple storage namespaces. In one embodiment, rev_id is a monotonically increasing integer that indicates the order of the revisions for that GUID.

The second relationship is one GUID to one or zero content item paths, and the third relationship is one GUID to one or zero branch points, which are similar. These relationships can be modeled as (guid, rev_id). The second and third relationships can map a GUID to another GUID at the point that the corresponding content item object was copied. This original GUID can be called a "parent GUID." GUIDs that lack a parent GUID can represent content item objects that were not derived from other content items. Content management system 106 can store these GUID relationships in one or more GUID databases, or can store these GUID relationships as metadata associated with the GUIDs or with the content item objects.

Content management system 106 may adjust or modify GUID assignments when performing logical operations on content items in the file system structure. Several examples are provided below in terms of a generic application programming interface (API) for accessing data stored in content management system 106. These example content item operations are described in terms of user-level file system operations. In this context, user-level means a high-level operation indicated by the user. Applications that access data via such an API may need to translate user-level operations into the operations described below to interact correctly with a GUID-enabled content management system 106. Each of the example operations described below can operate on an account with content management system 106 in the initial state shown below. Note that the rev parameter in the API can correspond to a server journal identifier (SJID) on a backend of content management system 106.

```
Format: <ns_id>:<rel_path> -> {<metadata_key>: <metadata_value>}
0:/foo.txt -> {guid: 0, sj_id: 0, rev: "A", is_dir: false, deleted: false}
0:/baz.txt -> {guid: 2, sj_id: 3, is_dir: false, deleted: true}
0:/qux.txt -> {guid: 2, sj_id: 5, is_dir: false, deleted: true}
0:/folder -> {is_dir: true, sj_id: 1, deleted: true}
0:/folder/bar.txt -> {guid: 1, sj_id: 2, rev: "B", is_dir: false, deleted: false}
Format: GUID:<GUID> -> [(<rev_id>, <ns_id>, <sj_id>)]
GUID:0 -> [(0, 0, 0)]
GUID:1 -> [(0, 0, 2)]
GUID:2 -> [(1, 0, 5)]
```

Content management system 106 can accomplish a simple add operation according to an API call with the following input parameters:

```
root: "account-root"
path: "/folder/baz.txt"
```

Based on these input parameters, content management system 106 can create a new content item located at "/folder/baz.txt". Content management system 106 can give this content item a new GUID and that GUID will not have any parent GUID association.

Content management system 106 can accomplish a simple edit operation according to an API call with the following input parameters:

```
root: "account-root"
path: "/foo.txt"
parent_rev: "A" (same as current rev)
```

Content management system 106 can retain the same GUID for the content item at /foo.txt, and add a new revision as indicated by the input parameters. Content management system 106 can perform some consistency checking to ensure that the revision indicated in the input parameters is valid, such as checking if a parent revision exists before linking a current revision to the parent revision.

Content management system 106 can accomplish a conflicted edit operation according to an API call with the following input parameters:

```
root: "account-root"
path: "/foo.txt"
parent_rev: "C" (different from current rev)
```

Because the parent_rev parameter does not match the current parent_rev of "foo.txt", content management system 106 can create a new content item, such as "foo (conflicted copy).txt". This new content item can have a new GUID pointing to the parent GUID 0, at rev_id 0.

Content management system 106 can accomplish a simple copy operation according to an API call with the following input parameters:

```
root: "account-root"
from_path:"/foo.txt"
to_path: "/folder/baz.txt"
```

Content management system 106 can create a new content item at "/folder/baz.txt" and assign the new content item a new GUID. The GUID of the new content item will have a parent GUID 0, at rev_id 0.

Content management system 106 can accomplish a simple move operation according to an API call that provides the following input parameters:

```
root: "account-root"
from_path: "/foo.txt"
to_path: "/folder/baz.txt"
```

Content management system 106 can move the content item "/foo.txt" to "/folder/baz.txt". The content item at "/folder/baz.txt" can keep the GUID 0 that was previously pointing to "/foo.txt". The GUID 0 also now has another revision, (1, 0, 6), and the SJID becomes 6 because it is the next consecutive SJID for the namespace 0.

Content management system 106 can accomplish a simple restore operation according to an API call with the following input parameters:

```
root: "account-root"
path: "/qux.txt" (same as latest path for this GUID)
```

Content management system 106 can restore the deleted content item "/qux.txt", and can maintain the GUID 2 that the deleted content item originally had. Further, content management system 106 can associate GUID 2 with an additional revision (2, 0, 6).

Content management system 106 can accomplish a conflicted restore operation according to an API call with the following input parameters:

```
root: "account-root"
path: "/baz.txt" (different from latest path for this GUID)
```

Content management system 106 can restore the content item "/baz.txt", but the GUID 2 that the content item "/baz.txt" originally had was last seen at a different path ("/qux.txt"). Content management system 106 can assign the content item "/baz.txt" a new GUID that points to the parent GUID 2 at the last rev_id for GUID 2 that was at "/baz.txt", which in this case is rev_id 0.

Having discussed some specific examples of content item operations, API calls, and corresponding actions performed by content management system 106, the disclosure turns to several example scenarios illustrating platform-specific details for implementing GUIDs in content management system 106. Given the preceding description of how GUID assignments change as the file system is modified, content management system 106 could propagate GUIDs correctly if the content items stored in content management system 106 were only accessible via a single, synchronous interface. However, content management system 106 can also provide an asynchronous interface that allows users to make asynchronous changes to content items without mediation. The asynchronous approach can make content item manipulation very responsive, but it can also make GUID propagation difficult.

In one example implementation of the asynchronous approach, a user can make changes to a content item stored at a local storage location, and a client application can synchronize those changes to a copy of the content item that is stored at content management system 106. However, changes to the local file system can occur by third-party applications or by the operating system itself without the client application acting as a mediator. Thus, the client application may not have a definitive way of knowing which content items are copies of other content items and which content items exist at specific locations because they were moved from other locations. The only information available to the client application may be the presence and absence of content items at specific path. The client application may not have move information. To propagate GUIDs properly in this environment, the content management system and the client application may need some way to obtain or derive move information between content items.

Due to the lack of move information, both the client application and content management system 106 synchronization logic has typically been based solely on presence and absence information, leading to an "eventually consistent system" that does not guarantee consistency at every point in time between the local storage and content management system 106. Instead the client application and content management system 106 guarantee that at some point in the future, after all activity has quiesced, the local storage will be consistent with what is stored in content management system 106.

The client application and content management system 106 can infer move and copy relationships between content items without directly mediating all move and copy operations if a unique identifier can be derived for each content item on the local file system. The semantics of such an ideal unique identifier can be satisfied using the proposed GUID generation technique described above. The proposed GUID generated by the client application can follow user-level moves, renames, and edits of a content item, and copies can generate new unique identifiers. Then as the client application synchronizes changes with content management system 106, the client application can map the proposed GUID back to the last known GUID with which it was associated.

Figure 3:
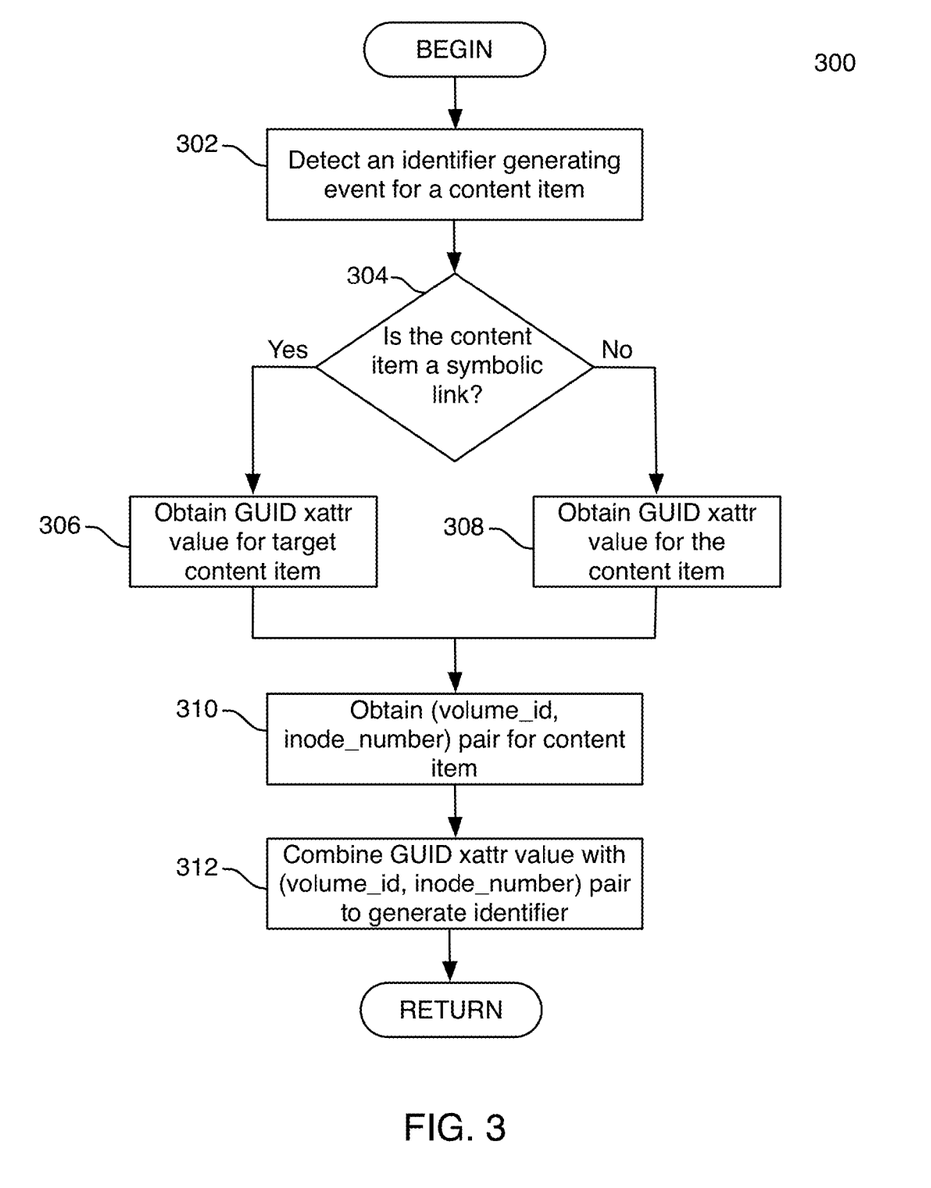
FIG. 3 shows an exemplary method embodiment for generating a proposed unique identifier for a content item.

FIG. 3 is a flowchart showing steps in exemplary method 300 for generating a unique content item identifier. For the sake of clarity, this method is discussed in terms of exemplary client device 102, in FIG. 2. Although specific steps are show in FIG. 3, in other embodiments a method can have more or less steps.

At some point client application 204 can detect an identifier-generating event for a content item (302). An identifier-generating event can include a content item creation, a content item copy, a content item move, a content item rename, or a content item delete.

After detecting the identifier-generating event, client application 204 can determine whether the content item for which the identifier is being generated is a symbolic link (304). If the content item is a symbolic link, client application 204 can obtain a GUID xattr value for the symbolic link's target content item (306). If the content item is not a symbolic link, client application 204 can obtain a GUID xattr value for the content item itself (308). If the content item is an existing content item, obtaining a GUID xattr for the content item can involve using the GUID xattr value already assigned to the content item as metadata. For example, if the identifier-generating event is a content item move or rename, the content item already exists and may have a GUID xattr value already assigned. However, if the content item does not already have a GUID xattr value, client application 204 can obtain a randomly generated value for the GUID xattr value.

The client application 204 can also obtain a volume identifier (volume_id) and inode number (inode_number) pair for the content item (310). Once client application 204 has obtained the GUID xattr and the (volume_id, inode_number) pair, the client application 204 can combine the values to generate a proposed GUID for the content item (312). In order to guarantee that the GUID xattr value is not reused when the content item is a copy of another content item, the GUID xattr value can be bound to the volume identifier and inode number for the content item. By combining these values, client application 204 can generate a proposed GUID identifier for the content item that satisfies a set of properties including: (1) the GUID is unique on the local client device; (2) the GUID is preserved across reboots, moves, renames, and content item modifications; (3) the GUID is not preserved when the content item is copied; and (4) the GUID is not reused after a content item is deleted. After generating the proposed GUID identifier, client application 204 can resume previous processing, which can include repeating method 300.

Figure 4A:
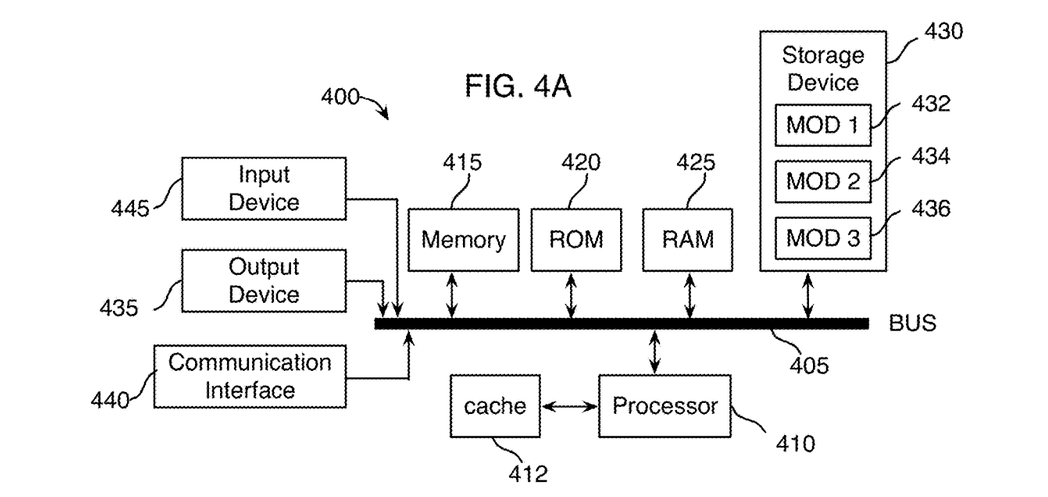
FIGS. 4A and 4B show exemplary possible system embodiments.
Figure 4B:
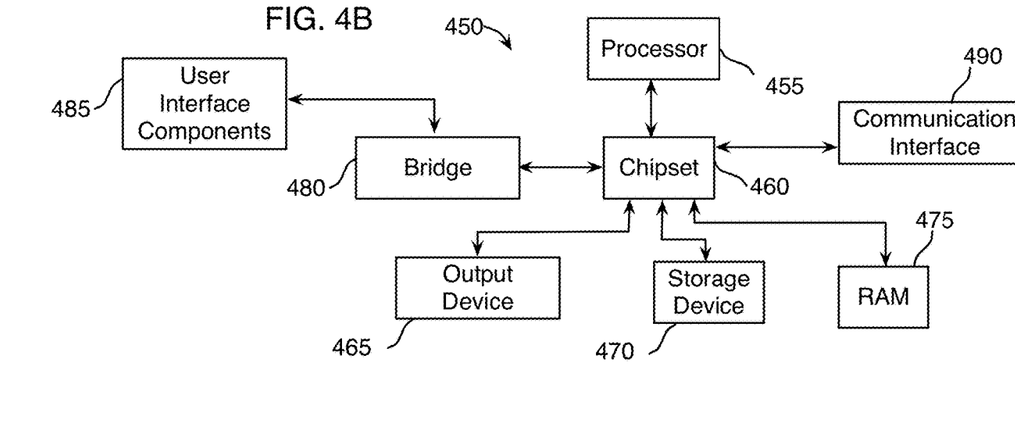

FIG. 4A and FIG. 4B show exemplary possible system embodiments. The more appropriate embodiment will be apparent to those of ordinary skill in the art when practicing the present technology. Persons of ordinary skill in the art will also readily appreciate that other system embodiments are possible.

FIG. 4A illustrates a conventional system bus computing system architecture 400 wherein the components of the system are in electrical communication with each other using a bus 405. Exemplary system 400 includes a processing unit (CPU or processor) 410 and a system bus 405 that couples various system components including the system memory 415, such as read only memory (ROM) 420 and random access memory (RAM) 425, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 may be available for use as well. The memory 415 can include multiple different types of memory with different performance characteristics. The processor 410 can include any general purpose processor and a hardware module or software module, such as module 1 432, module 2 434, and module 3 436 stored in storage device 430, configured to control the processor 410 as well as a special-purpose processor where software instructions are incorporated into the actual processor design. The processor 410 may essentially be a completely self-contained computing system, containing multiple cores or processors, a bus, memory controller, cache, etc. A multi-core processor may be symmetric or asymmetric.

To enable user interaction with the computing device 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the computing device 400. The communications interface 440 can generally govern and manage the user input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include software modules 432, 434, 436 for controlling the processor 410. Other hardware or software modules are contemplated. The storage device 430 can be connected to the system bus 405. In one aspect, a hardware module that performs a particular function can include the software component stored in a computer-readable medium in connection with the necessary hardware components, such as the processor 410, bus 405, display 435, and so forth, to carry out the function.

FIG. 4B illustrates a computer system 450 having a chipset architecture that can be used in executing the described method and generating and displaying a graphical user interface (GUI). Computer system 450 is an example of computer hardware, software, and firmware that can be used to implement the disclosed technology. System 450 can include a processor 455, representative of any number of physically and/or logically distinct resources capable of executing software, firmware, and hardware configured to perform identified computations. Processor 455 can communicate with a chipset 460 that can control input to and output from processor 455. In this example, chipset 460 outputs information to output 465, such as a display, and can read and write information to storage device 470, which can include magnetic media, and solid state media, for example. Chipset 460 can also read data from and write data to RAM 475. A bridge 480 for interfacing with a variety of user interface components 485 can be provided for interfacing with chipset 460. Such user interface components 485 can include a keyboard, a microphone, touch detection and processing circuitry, a pointing device, such as a mouse, and so on. In general, inputs to system 450 can come from any of a variety of sources, machine generated and/or human generated.

Chipset 460 can also interface with one or more communication interfaces 490 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 455 analyzing data stored in storage 470 or 475. Further, the machine can receive inputs from a user via user interface components 485 and execute appropriate functions, such as browsing functions by interpreting these inputs using processor 455.

It can be appreciated that exemplary systems 400 and 450 can have more than one processor 410 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
   detecting, by a client application, an identifier-generating event for a content item at a local storage location;
   determining whether the content item is a symbolic link to a target content item,
   when the content item is a symbolic link, obtaining a GUID extended file attribute value for the target content item by following the symbolic link to the target content item,
   when the content item is not a symbolic link, obtaining a GUID extended file attribute value for the content item from the content item directly;
   generating, by the client application, a proposed identifier based on content item attributes, wherein the proposed identifier satisfies at least a set of properties comprising:
      the proposed identifier is locally unique,
      the proposed identifier is preserved across client device reboots, content item moves, content item renames, and content item modifications,
      the proposed identifier is not preserved when the content item is copied,
      the proposed identifier is not reused after the content item is deleted,
      the proposed identifier comprises the GUID extended file attribute value, a volume identifier value, and an index node number;
   communicating, by the client application to synchronize with a synchronized content management system, the proposed identifier for the content item, wherein the proposed identifier contains information that permits the synchronized content management system to derive the identifier-generating event for the content item; and
   receiving, by the client application to synchronize with the synchronized content management system, a replacement identifier for the content item that is associated with the proposed identifier.

2. The computer-implemented method of claim 1, wherein the identifier-generating event for the content item is at least one of a content item creation, a content item copy, a content item move, a content item rename, or a content item delete.

3. The computer-implemented method of claim 1, wherein generating the proposed identifier comprises:
   combining the GUID extended file attribute value for the content item, the volume identifier value for the content item, and the index node number for the content item.

4. The computer-implemented method of claim 3, wherein combining the GUID extended file attribute value for the content item, the volume identifier value for the content item, and the index node number for the content item comprises:
   concatenating the GUID extended file attribute value, the volume identifier value, and the index node number to generate a string of characters.

5. The computer-implemented method of claim 1, wherein an assignment by the synchronized content management system for the proposed identifier is modified by the synchronized content management system.

6. A system comprising:
   a processor;
   a first module configured to control the processor to detect an identifier-generating event for a content item at a local storage location;
   a second module configured to control the processor to determine whether the content item is a symbolic link to a target content item,
      when the content item is a symbolic link, obtaining a GUID extended file attribute value for the target content item by following the symbolic link to the target content item,
      when the content item is not a symbolic link, obtaining a GUID extended file attribute value for the content item from the content item directly;
   a third module configured to control the processor to generate a proposed identifier based on content item attributes, wherein the proposed identifier satisfies at least a set of properties comprising:
      the proposed identifier is locally unique,
      the proposed identifier is preserved across client device reboots, content item moves, content item renames, and content item modifications,
      the proposed identifier comprises the GUID extended file attribute value, a volume identifier value, and an index node number; and
   a fourth module configured to control the processor to communicate with a synchronized content management system, the proposed identifier for the content item, wherein the proposed identifier contains information that permits the synchronized content management system to derive the identifier-generating event for the content item.

7. The system of claim 6, wherein the identifier-generating event for the content item is at least one of a content item creation, a content item copy, a content item move, a content item rename, or a content item delete.

8. The system of claim 6, wherein generating the proposed identifier comprises:
   combining the GUID extended file attribute value for the content item, the volume identifier value for the content item, and the index node number for the content item.

9. The system of claim 8, wherein combining the GUID extended file attribute value for the content item, the volume identifier value for the content item, and the index node number for the content item comprises:
   concatenating the GUID extended file attribute value, the volume identifier value, and the index node number to generate a string of characters.

10. The system of claim 6, wherein an assignment by the synchronized content management system for the proposed identifier is modified by the synchronized content management system.

11. A manufacture comprising:
   a non-transitory computer-readable storage medium; and
   a computer-executable instruction stored on the non-transitory computer-readable storage medium which, when executed by a computing device, cause the computing device to perform a method comprising:

detecting an identifier-generating event for a content item;
determining whether the content item is a symbolic link to a target content item,
when the content item is a symbolic link, obtaining a GUID extended file attribute value for the target content item by following the symbolic link to the target content item,
when the content item is not a symbolic link, obtaining a GUID extended file attribute value for the content item from the content item directly;
generating a proposed identifier based on content item attributes, wherein the proposed identifier satisfies at least a set of properties comprising:
the proposed identifier is locally unique,
the proposed identifier is preserved across client device reboots, content item moves, content item renames, and content item modifications,
the proposed identifier comprises the GUID extended file attribute value, a volume identifier value, and an index node number;
communicating the proposed identifier for the content item to synchronize with a synchronized content management system, wherein the proposed identifier contains information that permits the synchronized content management system to derive the identifier-generating event for the content item.

12. The manufacture of claim 11, wherein the identifier-generating event for the content item is at least one of a content item creation, a content item copy, a content item move, a content item rename, or a content item delete.

13. The manufacture of claim 11, wherein generating the proposed identifier comprises:
combining the GUID extended file attribute value for the content item, the volume identifier value for the content item, and the index node number for the content item.

14. The manufacture of claim 13, wherein combining the GUID extended file attribute value for the content item, the volume identifier value for the content item, and the index node number for the content item comprises:
concatenating the GUID extended file attribute value, the volume identifier value, and the index node number to generate a string of characters.

* * * * *